United States Patent [19]

Nishiuchi et al.

[11] Patent Number: 4,652,439

[45] Date of Patent: Mar. 24, 1987

[54] PROCESS FOR PREPARING FIBROUS ALKALI METAL TITANATE

[75] Inventors: Kihachiro Nishiuchi; Masayoshi Suzue, both of Tokushima; Koji Sakane, Hyogo, all of Japan

[73] Assignee: Otsuka Kagaku Kabushiki Kaisha, Osaka, Japan

[21] Appl. No.: 710,112

[22] Filed: Mar. 11, 1985

[30] Foreign Application Priority Data

Mar. 12, 1984 [JP] Japan ................................. 59-47779

[51] Int. Cl.4 ............................................. C01G 23/00
[52] U.S. Cl. ................................................... 423/598
[58] Field of Search ......................................... 423/598

[56] References Cited

U.S. PATENT DOCUMENTS

| | | | |
|---|---|---|---|
| 2,111,460 | 3/1938 | Rockstroh | 423/598 |
| 3,328,117 | 6/1967 | Emslie et al. | 423/598 |

FOREIGN PATENT DOCUMENTS

| | | | |
|---|---|---|---|
| 27827 | 3/1977 | Japan | 423/598 |
| 26298 | 3/1978 | Japan | 423/598 |
| 139826 | 12/1978 | Japan | 423/598 |
| 26719 | 3/1981 | Japan | 423/598 |

*Primary Examiner*—H. T. Carter
*Attorney, Agent, or Firm*—Murray and Whisenhunt

[57] ABSTRACT

A process for preparing a fibrous alkali metal titanate which comprises baking a mixture of rutile and an oxygen-containing alkali metal compound, rutile being finely pulverized to a particle size such that an average particle passes through a 200-mesh sieve, and pulverizing the resulting agglomerate.

7 Claims, No Drawings

PROCESS FOR PREPARING FIBROUS ALKALI METAL TITANATE

This invention relates to a process for preparing a fibrous alkali metal titanate, more particularly to a process for preparing a fibrous alkali metal titanate from rutile and oxygen-containing alkali metal compound.

Fibrous alkali metal titanates are useful as a plastic reinforcing material, abrasive material, filter material, diaphragm of a battery, pigment, insulating material, etc.

Many processes are already proposed to prepare a fibrous alkali metal titanate. They are, for example, a baking method, melting method, hydrothermal method, flux method and improved melting method. Generally, titanium oxide and a basic oxygen-containing alkali metal compound are used as starting materials in any of processes. However, Japanese Examined Patent Publication No. 27,264/1967 discloses, as a titanium oxide source, hydrous titania, anatase, a product containing $TiO_2$ obtained in sulfate method for preparing a pigment, purified anatase pigment, pulverized rutile ore and commercially available ilmenite. Alkali metal hydroxide, alkali metal carbonate, etc are disclosed as a basic oxygen-containing alkali metal compound. The above Japanese Publication No. 27,264/1967 is concerned with a preparation of a fibrous alkali metal titanate by baking a non-liquid mixture of the above titanium oxide source and the basic oxygen-containing alkali metal compound at a temperature of 200° to 1150° C. The above mixture is baked at a temperature of 200° to 850° C., in case of preparing alkali metal titanate containing predominantly colloid-type compound having a diameter of 0.005 to 0.1 μm and a length of at least ten times its diameter. When alkali metal titanate containing chiefly pigment-type compound having a diameter of 0.1 to 0.6 μm and a length of 10 to 100 times its diameter is to be prepared, the mixture is baked at a temperature of 850° to 975° C. In case that the mixture is baked at a temperature of 975° to 1150° C., alkali metal titanate is obtained which contains predominantly insulation-type compound having a diameter of 0.6 to 3.0 μm and a length of 100 to 1000 times its diameter. Further, it is disclosed to add an alkali metal halide to the starting non-liquid mixture prior to baking.

Flux method, improved melting method and baking method are considered to be industrially advantageous for preparing a fibrous alkali metal titanate in view of a scale merit and ease of making the process continuous. However, in order to make the titanate in an industrially practical cost, it is necessary to use a titanium oxide ore as a titanium source in preparing a fibrous alkali metal titanate, in place of a titanium oxide which cost corresponds to 80% of a total cost. As a titanium source are known ilmenite, titanium slag, rutile, anatase ore, etc. Ilmenite is generally poor in titanium oxide, effective component, of 50 to 60% by weight and contains a lot of silicon oxide and aluminum oxide which inhibit growth of crystal of a fibrous alkali metal titanate, hence impractical. Titanium slag contains titanium oxide of 75 to 80% by weight which is more than that in ilmenite, but is also high in contents of silicon oxide and aluminum oxide, thus insufficient as a titanium source of a fibrous alkali metal titanate. Rutile is high in titanium oxide content of 93 to 98% by weight and low in contents of silicon oxide and aluminum oxide, therefore most preferable as a titanium source of a fibrous alkali metal titanate. Processes of preparing a fibrous alkali metal titanate using rutile as a starting meterial are disclosed in Japanese Examined Patent Publication No. 27,264/1967 and Japanese Unexamined Patent Publication No. 1,359/1971. In these processes, a blended mixture is baked which comprises a pulverized rutile ore, at least one oxygen-containing alkali metal compound which produces $M_2O$ (M is sodium, potassium or mixture thereof) upon baking, and at least one alkali metal halide selected from the group consisting of sodium chloride and potassium chloride. Rutile ore is used in an amount of 2.8 to 3.45 moles (calculated as $TiO_2$) per mole of oxygen-containing alkali metal compound. Further, rutile ore is present in an amount of 1 to 6 parts by weight per part by weight of alkali metal halide. The blended mixture is baked at a temperature of 850° to 1020° C. for at least 15 minutes. These processes are classified into a flux method in which alkali metal halide is used as a flux. The obtained fibrous alkali metal titanate is difficult to separate from the fibrous agglomerate resulting from the baking and has a length of 10 to 20 μm and an aspect ratio of about 50 due to the breakage of fibers in the pulverization process. Thus, the obtained fibrous titanate has an insufficient property and a limited use. A fibrous agglomerate can be obtained by mixing rutile and an oxygen-containing alkali metal compound, $M_2O/TiO_2$ ratio being more than ½ in the mixture and M being an alkali metal, heating the mixture at a temperature of at least 1100° C. and cooling the molten mixture rapidly to a solid. However, the obtained fibrous materials are composed by alkali metal dititanates, amorphous by X-ray analysis, large in a fiber diameter and weak in strength. Thus, the fibrous material can be employed in chemical use but has a problem in physical use.

An object of the invention is to provide a process for preparing a fibrous alkali metal titanate with use of a titanium source which is inexpensive, easily available and has a slight inhibiting action in growth of crystals of the titanate.

Another object of the invention is to provide a process for preparing a fibrous alkali metal titanate which is easily separated from a fibrous agglomerate resulting from the baking and difficult to be broken in the pulverization process.

Still another object of the invention is to provide a process for preparing a fibrous alkali metal titanate which is great in aspect ratio and high in strength.

The above and other objects of the invention will be apparent from the following description.

The present invention provides a process for preparing a fibrous alkali metal titanate which comprises baking a mixture of rutile and an oxygen-containing alkali metal compound, rutile being finely pulverized to a particle size such that an average particle passes through a 200-mesh sieve, and pulverizing the resulting agglomerate.

It is essential for rutile to be finely pulverized to a particle size such that an average particle passes through a 200-mesh sieve. The rutile is adjusted to a particle size of preferably 200 to 425 mesh, more preferably 350 to 425 mesh. The adjustment of the rutile in particle size is conducted preferably without giving a distortion to crystals. For example, the rutile is preferably subjected to collision at a high velocity to obtain a desired particle size (hereinafter this is referred to as "jet-pulverizing method"), in order to grow a fiber length. The rutile contains titanium oxide of preferably 93 to 98% by weight. The remainder is $SiO_2$, $Al_2O_3$, $Fe_2O_3$, $ZrO_2$, etc.

The oxygen-containing alkali metal compound used in the invention are those producing $M_2O$ (M being alkali metal) upon baking. Examples thereof are KOH, $KNO_3$, $K_2CO_3$, $KHCO_3$, $K_2C_2O_4$, NaOH, $NaNO_3$, $Na_2CO_3$, $NaHCO_3$, $Na_2C_2O_4$, $CsNO_3$, CsOH, $Cs_2CO_3$, $RbOH$, $Rb_2CO_3$, etc.

The oxygen-containing alkali metal compound is preferably pulverized in a similar degree to the rutile but commercially available ones can also be used.

According to the invention, the desired fibrous alkali metal titanate can be obtained by baking a blended mixture of the above rutile and the oxygen-containing alkali metal compound and pulverizing the resulting agglomerate.

The proportions of the rutile and the oxygen-containing alkali metal compound are preferably 3 to 3.5 in terms of molar ratio of $TiO_2/M_2O$, but are not limited thereto. The blend of starting materials can be baked as it is, but is preferably pressed to prepare a shaped product having an enhanced density in order to improve their reactivities. In this case, it is preferable to add a small amount of water or a binder to the blend to give an excellent shapability. The blend is shaped at a suitable pressure which is usually 50 to 300 kg/cm$^2$.

The blend can be baked at a wide range of temperatures but is preferably baked at a temperature of 1000° to 1300° C. Further, it is preferable to gradually cool the alkali metal titanate resulting from the baking in order to grow the fiber length sufficiently. The gradual cooling is conducted by lowering the temperature in a wide range but is usually conducted at a temperature of 900° to 950° C. Further, fibers having higher aspect ratio can be obtained by repeating the above baking process at least twice.

By the above reaction can be obtained an agglomerate which is predominantly fibrous. In the invention, the agglomerate is pulverized to prepare a fibrous alkali metal titanate having a high aspect ratio. In this case, it is preferable to roughly pulverize the agglomerate and then to finely pulverize the resulting bulk by subjecting the bulk to collision each other at a high velocity. Further, it is preferable to immerse the bulk in water and then pulverize it after drying.

Further, it is also preferable to conduct the pulverization by a jet-pulverizing method. After the pulverization, a fiber having a high aspect ratio is obtained by washing with water and drying.

The fibrous alkali metal titanate of the invention is a compound represented by the formula

$M_2O.nTiO_2$ wherein M is alkali metal, n is a real number of 2 to 8, or a mixture of these compounds. The above titanate has a fiber diameter of preferably 0.1 to 0.5 μm and a fiber length of preferably 20 to 100 μm.

The invention will be described below with reference to Examples and Comparison Examples.

EXAMPLE 1

Rutile sand was pulverized in dry state by a jet-pulverizing machine [PJM-100 type, a product of Nihon Neumatic Industry Co., Ltd.] and classified with use of a sieve shaker to obtain particles of 350 to 400 mesh. To the rutile particles was admixed potassium carbonate such that $TiO_2/K_2O$ molar ratio was 3. The mixture was sprayed with a small amount of water and then shaped by a press at a pressure of 200 kg/cm$^2$. The shaped mixture was placed into a muffle farnace and heated at 1050° C. for about 3 hours, then gradually cooled to 950° C. at a rate of 20° C./hr and maintained at the same temperature for about 2 hours. The mixture was heated at 1050° C. again for about 3 hours to complete the reaction. After cooled to room temperature, the resulting agglomerate was taken out from the furnace and roughly pulverized. The resulting bulk was finely pulverized by a jet-pulverizing machine (PJM-100 type) to prepare fibers. The fibers were dispersed in a large amount of water. The dispersion was filtered and the filtrate was classified and dried to obtain fibrous potassium titanate. Table 1 shows yield and fiber properties of the potassium titanate. From Table 1, fibrous potassium titanate having a extremely high aspect ratio (fiber length/fiber diameter) was obtained with a high yield.

EXAMPLE 2

Rutile sand pulverized by a jet-pulverizing machine is sharply shaped and contrasts with round-shaped one pulverized by a ball mill. As an oxygen-containing alkali metal compound, potassium hydroxide was pulverized by a jet-pulverizing machine. To the potassium hydroxide was admixed rutile sand having a particle size of 350 to 400 mesh such that $TiO_2/K_2O$ molar ratio was 3.5. The mixture was sprayed with a small amount of aqueous solution of polyvinyl alcohol and then shaped by a press at a pressure of 300 kg/cm$^2$ to prepare pellets of each 25 g. The pellets were placed into a muffle farnace and heated at 1100° C. for about 3 hours, then gradually cooled to 930° C. at a rate of 70° C./hr and maintained at the same temperature for about one hour. The pellets were heated at 1100° C. again for about 2 hours to complete the reaction. After cooled to room temperature, the pellets, composed predominantly by fibers, were pounded with a stick to prepare roughly pulverized pellets. The pellets were then finely pulverized by subjecting them to collision each other at a high velocity with use of a jet-pulverizing machine (PJM-100 type) to prepare fibers. The fibers were dispersed in a large amount of water. The dispersion was neutralized with a dil-HCl and filtered. The filtrate was classified, dried and baked at 900° C. for one hour to obtain fibrous potassium titanate. Table 1 gives yield and fiber properties of the potassium titanate.

EXAMPLE 3

Rutile sand was pulverized in dry state by a jet-pulverizing machine to particles having 350 to 400 mesh. Elementary analysis (wt %) was 97.5% in $TiO_2$, 0.20% $SiO_2$, 0.25% $Al_2O_3$, 0.15% $Fe_2O_3$, 0.50% $ZrO_2$. To the rutile particles in a mortar was admixed unpulverized potassium carbonate such that $TiO_2/K_2O$ molar ratio was 3. The mixture was thoroughly admixed and then shaped by a press at a pressure of 200 kg/cm$^2$ to prepare a shaped product of 60 mm in diameter and of 30 mm in height. The shaped product was placed into a muffle furnace and heated at 1050° C. for about 8 hours.

The baked product was roughly pulverized and immersed in water over night. Water was removed by filtration and the filtrate was dried in an oven. The dried product was pulverized by a jet-pulverizing machine (PJM-100 type) to obtain fibrous potassium titanate. Table 1 shows yield and fiber properties of the fibrous potassium titanate.

COMPARISON EXAMPLE 1

Rutile sand pulverized by a ball mill and having the same elementary analysis as that of Example 3 was blended with potassium carbonate and potassium chloride in the following proportions; 150 g of the pulverized rutile sand, 81 g of $K_2CO_3$ ($TiO_2/K_2O$ molar ratio is 3.2) and 75 g of KCl ($TiO_2/KCl$ weight ratio is 2.0). The rutile sand had a particle size of 350 to 400 mesh. $K_2CO_3$ passed through a 350-wire sieve. KCl was a fine powder of industrial grade. These ingredients were thoroughly blended by a mixer. The mixture was sprayed with 20 g of water and then shaped by a press at a pressure of 100 kg/cm² to prepare agglomerates. The agglomerate was placed into a muffle furnace, heated at 1050° C. and maintained at the same temperature for about 5 hours. The baked agglomerate was immersed in water over night, pounded with a stick and further pulverized by a colloid mill. The resulting slurry was adjusted in pH and then filtered to obtain a fibrous potassium titanate. The fibrous potassium titanate was classified by a classifier. The resulting fibers were collected. The fibers were dried, and yield and properties thereof were given in Table 1.

COMPARISON EXAMPLE 2

As a titanium source was used rutile sand of 350 to 400 mesh pulverized by a ball mill and having the same elementary analysis as that of Comparison Example 1. A fibrous potassium titanate was prepared in the same manner as in Example 3. Table 1 shows yield and fiber properties of the fibrous potassium titanate.

COMPARISON EXAMPLE 3

To 341 g of rutile sand of 350 to 400 mesh pulverized by a ball mill and having the same elementary analysis as that of Comparison Example 1 was added 287.6 g ($TiO_2/K_2O$ molar ratio is 2.0) of potassium carbonate. The mixture was thoroughly admixed, placed into a platinum crucible, then placed into a muffle furnace and heated at 1100° C. for about 3 hours. After heating, the platinum crucible was immediately taken out from the furnace and the molten product therein was poured rapidly into an another platinum crucible. The molten product rapidly solidify to obtain fibrous materials. The fibrous materials as placed in the crucible are immersed in water over night to separate out fibers. Water was added to the resulting slurry and the dispersion was pulverized by a portable pulper to obtain pulverized fibers. The fibers were filtered, dried and classified by a classifier. The resulting fibers were collected. The fibers were dried, and yield and properties thereof were given in Table 1.

TABLE 1

|  | Example | | | Com. Example | | |
|---|---|---|---|---|---|---|
|  | 1 | 2 | 3 | 1 | 2 | 3 |
| Yield (%) | 99 | 98 | 98 | 97 | 98 | 99 |
| Average fiber diameter (μm) | 0.3 | 0.3 | 0.3 | 0.5 | 0.6 | 3 |
| Average fiber length (μm) | 60 | 70 | 48 | 20 | 30 | 200 |
| Aspect ratio | 200 | 233 | 160 | 40 | 50 | 67 |
| Component (Note 1) | A | B | A and B | B | A and B | C |
| pH of dispersion | 9.8 | 7.2 | 9.5 | 8.0 | 9.7 | 11.0 |

(Note 1)
A: potassium tetratitanate
B: potassium hexatitanate
C: potassium dititanate

EXAMPLE 4

Fibrous potassium titanate was obtained in the same manner as in Example 1 without heating the mixture again at 1050° C. after the gradual cooling.

Yield was 98%, average fiber diameter 0.3 μm, average fiber length 58 μm, respect ratio 193, fiber component=A (namely potassium tetratitanate), pH of dispersion 9.8.

EXAMPLE 5

Rutile sand was pulverized in dry state by a jet-pulverizing machine (PJM-100 type) to particles having 350 to 400 mesh. As an oxygen-containing alkali metal compound, potassium hydroxide was pulverized by a jet-pulverizing machine. To the potassium hydroxide was admixed rutile sand such that $TiO_2/K_2O$ molar ratio was 3.5. The mixture was shaped by a press at a pressure of 200 kg/cm² to prepare pellets. The pellets were placed into a muffle farnace and heated at 1170° C. for about 3 hours, then gradually cooled to 950° C. at a rate of 30° C./hr and maintained at the same temperature for about one hour. The pellets were heated at 1170° C. again for about 2 hours and then gradually cooled to 950° C. at a rate of 30° C. to complete the reaction. After cooled to room temperature, the pellets, composed predominantly by fibers, were pounded with a stick to prepare roughly pulverized pellets. The pellets were then finely pulverized by subjecting them to collision each other at a high velocity with use of a jet-pulverizing machine (PJM-100 type) to prepare fibers. The fibers were dispersed in a large amount of water. The dispersion was neutralized with a dil-HCl and filtered. The filtrate was classified, dried and baked at 900° C. for one hour to obtain fibrous potassium titanate.

Yield was 98%, average fiber diameter 0.4 μm, average fiber length 96 μm, aspect ratio 240, fiber component=A and B (namely potassium tetratitanate and potassium hexatitanate), pH of dispersion 9.6.

We claim:

1. A process for preparing a fibrous alkali metal titanate selected from the group consisting of compounds of the formula $$M_2O.nTiO_2$$

where M is alkali metal and n is a real number of 2 to 8 and mixtures thereof, which comprises baking at a temperature of 1000° to 1300° C. a mixture of rutile and an alkali metal compound which produces $M_2O$, M being as previously defined, upon baking, rutile being finely pulverized to a particle size such that an average particle passes through a 200-mesh sieve;

gradually cooling the baked product, at a cooling rate of 20° to 70° C./hr., to a temperature of 900° to 950° C.; and pulverizing the resulting agglomerate.

2. A process as defined in claim 1 wherein the mixture was baked at 1000° to 1300° C., gradually cooled to 900° to 950° C. and further baked again at 1000° to 1300° C.

3. A process as defined in claim 1 wherein the processes are repeated at least twice which comprise baking at 1000° to 1300° C. and gradual cooling to 900° to 950° C.

4. A process as defined in claim 1 wherein the pulverization of the agglomerate is conducted by a jet-pulverizing method.

5. A process as defined in claim 1 wherein the rutile contains titanium oxide in an amount of 93 to 98% by weight.

6. A process as defined in claim 1 wherein the oxygen-containing alkali metal compound is at least one selected from the group consisting of alkali metal hydroxide and alkali metal carbonate.

7. A process as defined in claim 1 wherein the rutile is pulverized by a jet-pulverizing method.

* * * * *